(12) United States Patent
Akishiba (10) Patent No.: US 6,700,671 B2
(45) Date of Patent: Mar. 2, 2004

(54) NON-CONTACT TYPE PROFILE MEASURING APPARATUS

(75) Inventor: Yuji Akishiba, Osaka (JP)

(73) Assignee: Keyence Corporation, Osaka (JP)

( * ) Notice: Subject to any disclaimer, the term of this patent is extended or adjusted under 35 U.S.C. 154(b) by 280 days.

(21) Appl. No.: 09/974,728

(22) Filed: Oct. 10, 2001

(65) Prior Publication Data

US 2002/0041381 A1 Apr. 11, 2002

(30) Foreign Application Priority Data

Oct. 10, 2000 (JP) .................................. P. 2000-309944

(51) Int. Cl.[7] .................. G01B 11/04; G01B 11/08; G01B 11/02; G01N 21/84
(52) U.S. Cl. .................. 356/638; 356/635; 356/429
(58) Field of Search .................. 356/638, 635, 356/636, 429, 238.2, 335

(56) References Cited

U.S. PATENT DOCUMENTS

| | | | | |
|---|---|---|---|---|
| 3,947,129 A | * | 3/1976 | Wiklund | 356/638 |
| 4,129,384 A | * | 12/1978 | Walker et al. | 356/640 |
| 4,207,002 A | * | 6/1980 | Gara et al. | 356/615 |
| 4,636,080 A | * | 1/1987 | Feldman | 356/401 |
| 4,648,712 A | * | 3/1987 | Brenholdt | 356/73 |
| 4,893,929 A | * | 1/1990 | Miyamoto | 356/336 |
| 5,270,794 A | | 12/1993 | Tsuji et al. | 356/371 |
| 5,615,014 A | * | 3/1997 | Okuda | 356/429 |

FOREIGN PATENT DOCUMENTS

JP          59-61704          4/1984

* cited by examiner

*Primary Examiner*—Russell Adams
*Assistant Examiner*—D. Ben Esplin
(74) *Attorney, Agent, or Firm*—Kilyk & Bowersox, P.L.L.C.

(57) ABSTRACT

A collimator lens 13 converts a light transmitted from a light source 11 into an almost parallel light. A light receiving lens 14 receives the almost parallel light including a shadow 24 of a measurement object 23. A one-dimensional image sensor 17 receives a light passing through a diaphragm 15. A two-dimensional image sensor 19 receives a light split by a beam splitter 16 through a second diaphragm 18. A signal processing section 20 obtains an outside dimension and a monitor image of a measured portion of the measurement object 23 by processing electric signals sent respectively from the image sensors 17 and 19. A display section 21 displays the outside dimension and the monitor image of the measured portion of the measurement object 23.

6 Claims, 7 Drawing Sheets

NON-CONTACT TYPE PROFILE
MEASURING APPARATUS

BACKGROUND OF THE INVENTION

1. Field of the Invention

The present invention relates to a non-contact type profile measuring apparatus for irradiating parallel rays on a measurement object, thereby measuring the dimension of a generated shadow portion as the outside dimension of the measurement object.

2. Related Art

There is a non-contact type profile measuring apparatus having a laser and a polygon mirror in a light projecting section. A laser beam oscillated within a constant angle range by the polygon mirror passes through a mirror and a collimator lens to be changed into parallel rays. The parallel rays are irradiated on a measurement object, for example, a cylindrical and long object. Then the parallel rays including a shadow thereof are received by a light receiving element through a light receiving lens.

The light receiving element converts a light receiving signal including the shadow of the measurement object into an electric signal. The electric signal is sent to a signal processing section including a microprocessor. The signal processing section detects, through edge extraction, a portion corresponding to the shadow of the measurement object in the light receiving signal received by the light receiving element. Further, the signal processing section calculates the dimension of the shadow from a time of the edge extraction. A value thus obtained is displayed on a display section of the non-contact type profile measuring apparatus as a measurement result of the outside dimension of the measurement object.

In addition to the advantage that measuring precision is high, the non-contact type profile measuring apparatus using the laser has an advantage that a measured portion of the measurement object can be confirmed easily because the locus of the laser which can be visualized is described on the surface of the measurement object. With respect to the measuring apparatus, however, there is a problem in that the apparatus is expensive and the service life of the movable section for rotating the polygon mirror is undesirable.

There is another non-contact type profile measuring apparatus having a telecentric optical system. The telecentric optical system has such a structure that a diaphragm is provided in the focal position of a light receiving lens so that only parallel rays or components close thereto in a light which has passed through the light receiving lens pass through the diaphragm and then reach a one-dimensional image sensor.

According to such a structure, it is possible to use an inexpensive light source such as a light emitting diode or a lamp for a light projecting section in place of a laser. Moreover, deflecting means, such as a polygon mirror, is not required.

One of the drawbacks of the non-contact type profile measuring apparatus using the telecentric optical system, however, is that the measured portion of the measurement object is visualized with difficulty. In the system using the laser and the polygon mirror, the section of the parallel rays obtained by the collimator lens has a straight shape, and a locus thereof is described on the surface of the measurement object. Therefore, the measured portion can be visualized easily. In the telecentric optical system, however, the uniform section obtained by the collimator lens is almost circular. Therefore, it is hard to specify the measured portion even if a light source having a visable color is used.

SUMMARY OF THE INVENTION

In order to solve the problems described above, it is an object of the invention to provide a non-contact type profile measuring apparatus having a telecentric optical system, which easily specifies a measured portion of a measurement object.

The above-mentioned object can be achieved by a non-contact type profile measuring apparatus, according to the invention, comprising:

a converting section for converting a light transmitted from a light source into a light including a component parallel with an optical axis;

a light receiving lens for receiving a light including a shadow of a measurement object which is provided to intercept a part of the light;

a diaphragm provided in a rear side focal position of the light receiving lens;

a one-dimensional image sensor for receiving a light passing through the diaphragm;

a signal processing section for obtaining a dimension of the shadow of the measurement object as an outside dimension of the measurement object by processing an electric signal obtained from the one-dimensional image sensor;

a display section for displaying the outside dimension thus obtained;

a beam splitter provided on an optical path between the light receiving lens and the one-dimensional image sensor; and a two-dimensional image sensor for receiving a light split by the beam splitter, wherein the signal processing section processes an electric signal obtained from the two-dimensional image sensor, and the display section displays a monitor image including a measured portion of the measurement object. A light diffusing plate or a collimator lens may be used for the converting section for converting the light transmitted from the light source into the light including a component parallel with the optical axis. Alternatively, the surface of a lens of an LED to be used for the light source may be processed to have a diffusing function.

According to such a structure, the monitor image including the measured portion of the measurement object is displayed on the display section. Therefore, a user can easily specify the measured portion of the measurement object. The circular section of the parallel rays in the telecentric optical system having the light receiving lens and the diaphragm provided in the rear side focal position thereof, is a region to be displayed as the monitor image.

It is preferable that the beam splitter is provided between the diaphragm and the one-dimensional image sensor. Such an arrangement can be provided in a magnifying optical system capable of increasing a distance between the diaphragm and the one-dimensional image sensor. An advantage of the present invention is that a diaphragm is not required for an optical path from the beam splitter to the two-dimensional image sensor.

In the case in which the beam splitter is provided between the light receiving lens and the diaphragm, a second diaphragm is further provided in a second rear side focal position of the light receiving lens formed between the beam splitter and the two-dimensional image sensor. By decreasing the distance between the diaphragm and the one-dimensional image sensor to obtain a reducing optical system, it is possible to obtain the advantage wherein the optical system can be of a smaller size.

The distance is generally based on the available range of the beam splitter. Therefore, compared with the beam splitter provided between the diaphragm and the one-dimensional image sensor, the distance between the diaphragm and the one-dimensional image sensor in the case where the beam splitter is provided between the light receiving lens and the diaphragm, can be decreased by the available range of the beam splitter. One example of the decreasable distance is basically a range of from 10mm to 100mm, although the distance depends on device size and the like.

Further, it is preferable that the signal processing section obtains a measuring line corresponding to the measured portion of the measurement object from which the one-dimensional image sensor receives the light, and the display section displays the measuring line so that it is superposed on the monitor image of the measurement object. Consequently, the user can specify the measured portion of the measurement object more accurately. A method of controlling the display position of the measuring line which is to be carried out before the shipment of the profile measuring apparatus will be described below.

Furthermore, it is preferable that the signal processing section obtains a mark indicative of an edge position of the shadow of the measurement object by processing the electric signal obtained from the one-dimensional image sensor, and the display section displays the mark so that it is superposed on the monitor image of the measurement object. Consequently, the user can visually confirm a portion (edge position) measured as the outside dimension (from an edge to an edge) in the measured portion (measuring line) of the measurement object. A method of controlling the relationship between the mark display of the edge position and the monitor image which is to be carried out before the shipment of the measuring apparatus will be described below.

As described above, according to the non-contact type profile measuring apparatus having the telecentric optical system of the invention, the monitor image including the measured portion of the measurement object is displayed on the display section. Therefore, a user can easily specify the measured portion of the measurement object. Moreover, the measuring line indicative of the measured portion measured by the one-dimensional image sensor and the mark indicative of the edge position on the measuring line are displayed on the display section so that they are superposed on the monitor image. Therefore, in the case in which the outside dimension of the particular portion of the measurement object is measured, it is possible to accurately position the measurement object in such a manner that the shift or inclination of the measurement object is not caused while watching the monitor image.

DESCRIPTION OF THE PREFERRED EMBODIMENTS

Embodiments of the invention will be described below with reference to the drawings.

Figure 1:
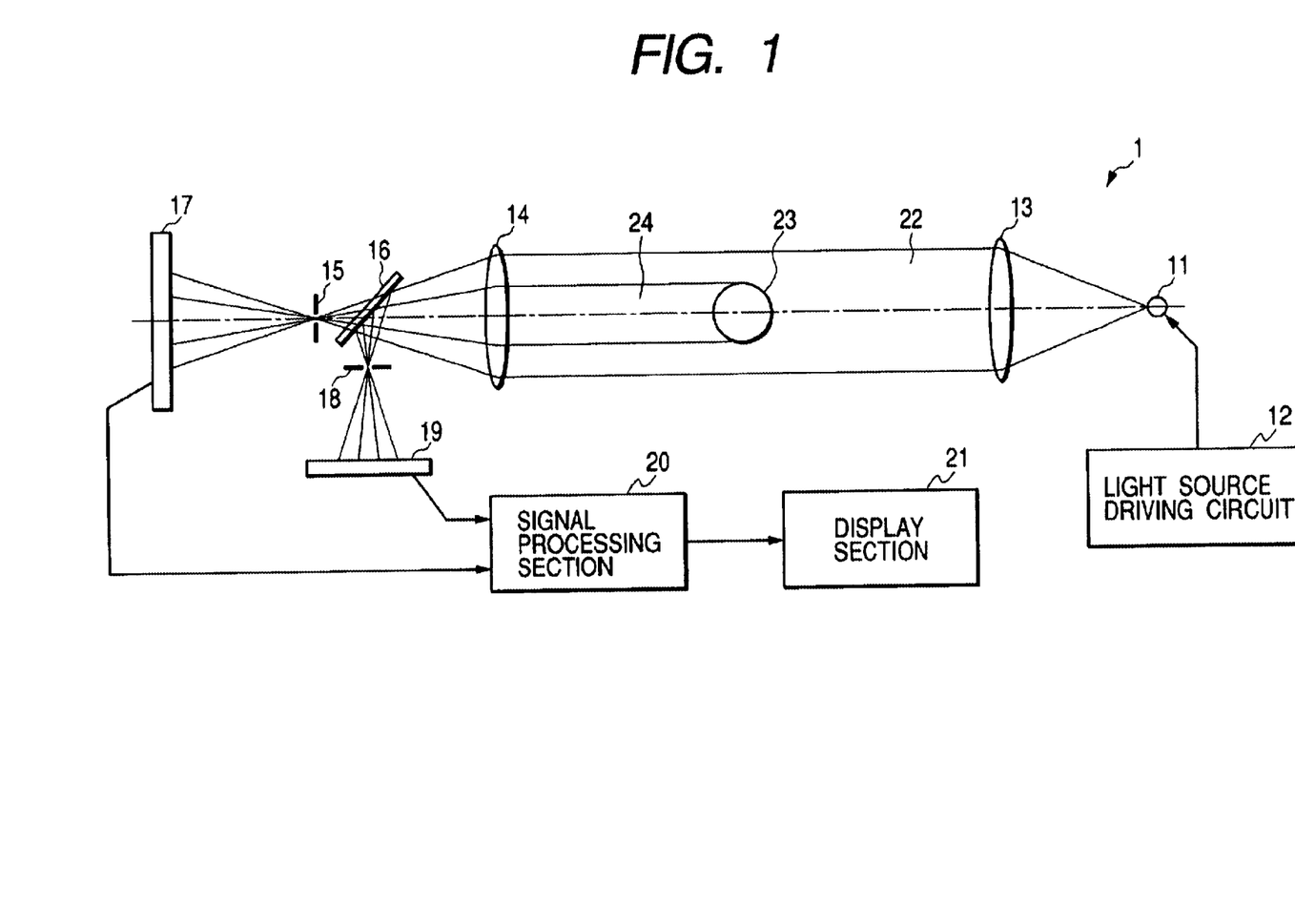
FIG. 1 is a block diagram showing a structure including the optical system of a non-contact type profile measuring apparatus according to an embodiment of the invention.

FIG. 1 is a block diagram showing a structure including an optical system of a non-contact type profile measuring apparatus according to the embodiment of the invention. A non-contact type profile measuring apparatus 1 comprises a light source 11, a light source driving circuit 12, a collimator lens 13, a light receiving lens 14, a first diaphragm 15, a beam splitter 16, a one-dimensional image sensor 17, a second diaphragm 18, a two-dimensional image sensor 19, a signal processing section 20, and a display section 21. The light source 11 includes an LED (light emitting diode) or a lamp. The one-dimensional image sensor 17 will also be referred to as a linear sensor. The two-dimensional image sensor 19 will also be referred to as an area sensor. The display section 21 includes a CRT (for example, a cathode ray tube) or a LCD (a liquid crystal display).

A light emitted from the light source 11 driven by the light source driving circuit 12 is changed into a parallel ray 22 through the collimator lens 13. The parallel ray 22 is irradiated on a measurement object 23. The collimator lens 13 transmits a ray beam including a parallel ray. The light receiving lens 14 typically receives only the parallel ray from the ray beam which passes through the collimator lens 13, that is, the whole ray beam transmitted from collimator lens 13 can, for example, be from 3 times to 5 times more than the amount of light encompassed by the parallel ray 22. The measurement object can be any shape and/or size. For example, the measurement object 23 is almost cylindrical and long. A diameter of the measurement object 23 is an outside dimension to be measured. A shadow portion 24 is generated on the rear side of the measurement object 23. By obtaining the width (dimension) of the shadow portion 24, therefore, the outside dimension of the measurement object 23 is measured.

The parallel ray 22 (or almost parallel ray) including the shadow portion 24 of the measurement object 23 is collected by the light receiving lens 14. The collected ray is incident on the one-dimensional image sensor 17 through the beam splitter 16 and the first diagram 15. Moreover, the light split by the beam splitter 16 is incident on the two-dimensional image sensor 19 through the second diaphragm 18.

The first diaphragm 15 is provided in the position of a rear side focal point of the light receiving lens 14. Consequently, there is formed a telecentric optical system in which only parallel rays or components close thereto in the light passing through the light receiving lens 14 reach the one-dimensional image sensor 17 through the first diaphragm 15.

Similarly, the second diaphragm 18 is provided in a second rear side focal position formed between the beam splitter 16 and the second-dimensional image sensor 19. The parallel rays or components close thereto in the light passing through the light receiving lens 14 reach the two-dimensional image sensor 19 through the second diaphragm 18.

The one-dimensional image sensor 17 is preferably a linear image sensor having the pixel of a CCD arranged in a line, for example. In general, the one-dimensional image sensor is specialized to acquire the one-dimensional information (length) of the measurement object. Therefore, the one-dimensional image sensor has a pitch between pixels which is smaller (a resolving power which is higher) than that in the two-dimensional image sensor. For example, the pitch between the pixels of the one-dimensional image sensor can be 7 microns while the pitch between pixels of the two-dimensional image sensor can be 10 microns, although these values change depending on the progress of the technology. Furthermore, the one-dimensional image sensor has a feature wherein the processing time required for transferring electric charges for one cycle is short. For example, the processing time of the one-dimensional image sensor can be 0.2 millisecond while the processing time of the two-dimensional image sensor can be about 16 milliseconds, although these values change depending on the progress of the technology. Other times are possible. When such a one-dimensional image sensor 17 is used for measuring the outside dimension, the structure of the signal processing section can be simplified and the measurement can be carried out at a high speed, in view of the improvements and benefits described above.

The two-dimensional image sensor 19 is an ordinary CCD area sensor. The two-dimensional image sensor 19 is used for picking up a monitor image within the parallel rays 22 including the shadow portion 24 of the measurement object 23. A color image sensor or a monochrome image sensor may be used as two-dimensional image sensor 19.

Figure 2:
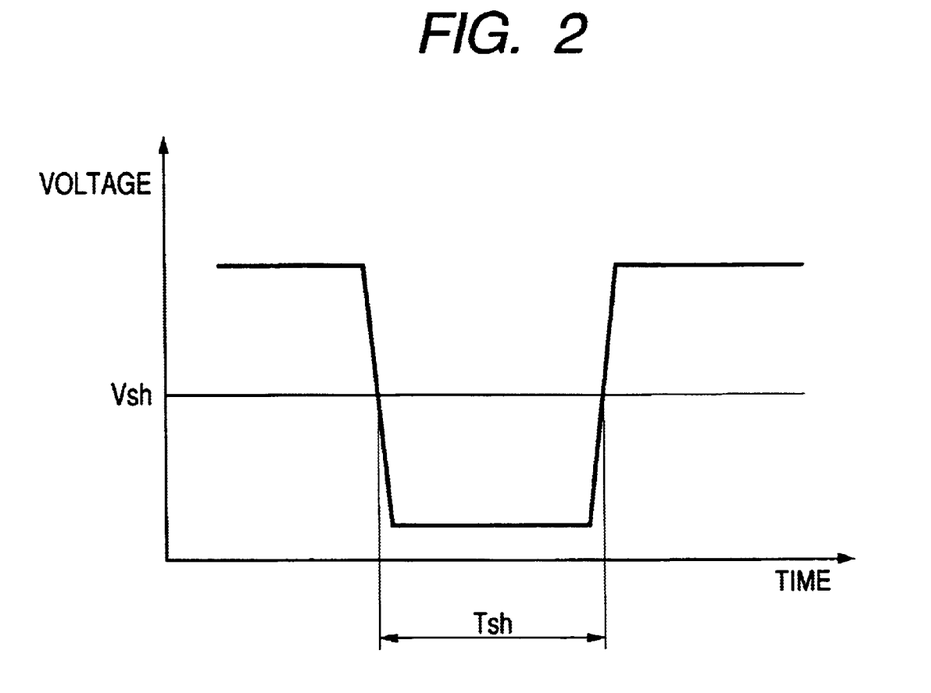
FIG. 2 is a chart showing an example of the voltage waveform of the output signal of a one-dimensional image sensor.

FIG. 2 shows an example of the voltage waveform of the output signal of the one-dimensional image sensor 17. A voltage level corresponds to the amount of light receipt of the one-dimensional image sensor 17. The voltage level is greatly reduced in a portion corresponding to the shadow portion 24 of the measurement object 23. By comparing the output signal of the one-dimensional image sensor 17 with a predetermined threshold Vsh, a time Tsh corresponding to the width of the shadow portion 24 of the measurement object 23 is obtained. If a length (dimension) corresponding to the time Tsh is calculated, the outside dimension of the measurement object 23 (for example, the diameter of a cylindrical and long object) can be measured.

In the actual signal processing section 20, the edge detection is carried out to accurately obtain the time Tsh. More specifically, the edge detection accurately acquires a leading edge and a trailing edge in the output signal of the one-dimensional image sensor 17. As a method of carrying out the edge detection, for example, there is a well known method of obtaining the zero cross point of a two-step differential waveform. By calculating the time between the edges thus obtained, the time Tsh corresponding to the outside dimension of the measurement object 23 is accurately obtained.

Figure 3:
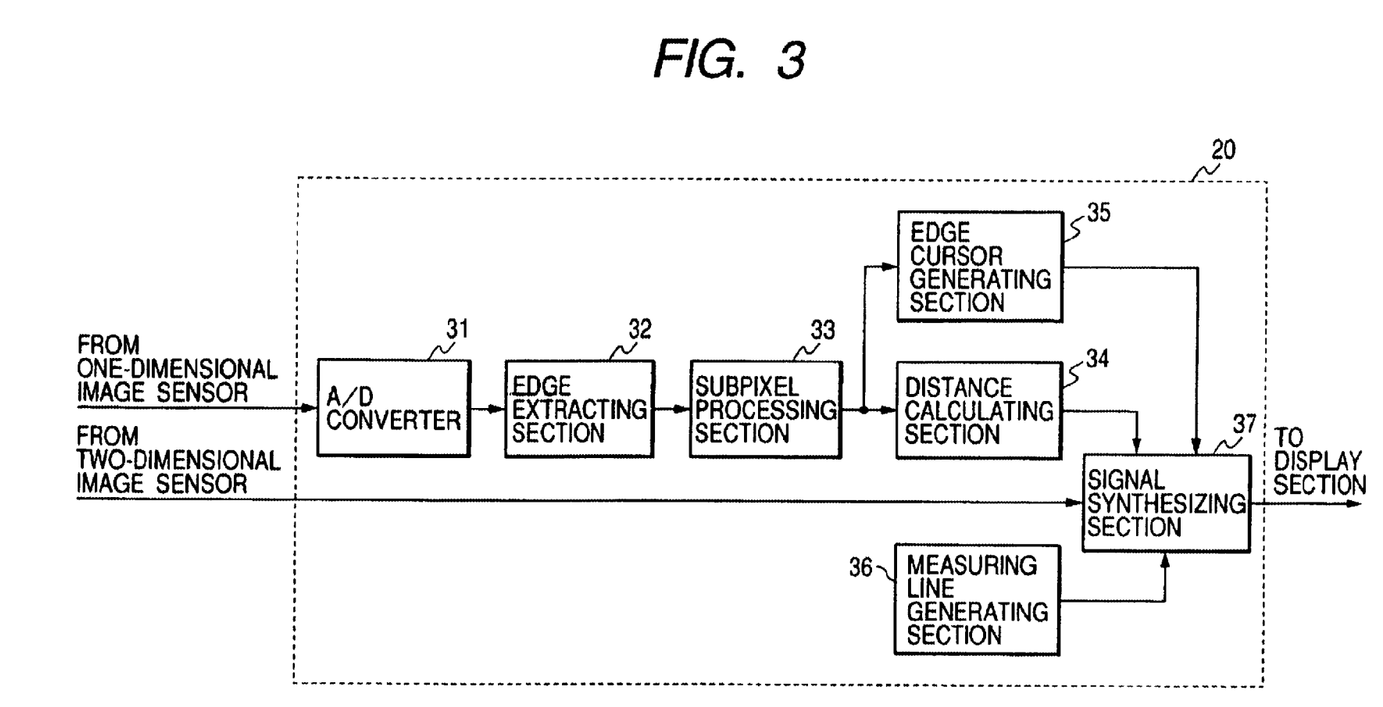
FIG. 3 is a block diagram showing the internal structure of a signal processing section.

FIG. 3 is a block diagram showing the internal structure of the signal processing section 20 in the non-contact type profile measuring apparatus according to the embodiment. The signal processing section 20 has an A/D converter 31, an edge extracting section 32, a subpixel processing section 33, a distance calculating section 34, an edge cursor generating section 35, a measuring line generating section 36 and a signal synthesizing section 37.

The output signal of the one-dimensional image sensor 17 is converted into a digital signal by the A/D converter 31 and is then sent to the edge extracting section 32. The leading and trailing edges of the portion corresponding to the shadow portion 24 of the measurement object 23 are extracted in the edge extracting section 32. In the subpixel processing section 33, a subpixel processing is carried out and data obtained after the processing are given to the distance calculating section 34. The subpixel processing is to smooth a step-like change in a voltage between the picture elements (pixels) of the image sensor by an average processing. The distance calculating section 34 calculates the distance (length) between the edges on the basis of data on the edge position. The processing of each of the sections is mainly executed according to the program of the microprocessor in the embodiment.

The distance data calculated by the distance calculating section 34 is given to the display section 21 through the signal synthesizing section 37, and is numerically displayed as a measured value of the outside dimension on the screen of the display section 21. Moreover, the signal synthesizing section 37 directly receives the output signal of the two-dimensional image sensor 19. The output signal of the two-dimensional image sensor 19 is equivalent to a monitor image signal within the parallel ray 22 including the shadow portion 24 of the measurement object 23 as described above. Consequently, the monitor image including the measured portion of the measurement object 23 is displayed together with the measured value of the outside dimension on the screen of the display section 21.

Further, the measuring line generating section 36 generates a measuring line corresponding to the measured portion of the measurement object measured by the one-dimensional image sensor 17. The edge cursor generating section 35 generates an edge cursor (edge position mark) corresponding to the edge position of the shadow portion 24 of the measurement object 23 in the measuring line.

The measuring line generated by the measuring line generating section 36 and the edge cursor generated by the edge cursor generating section 35 are superposed on the monitor image and are displayed on the screen of the display section 21. The details of the display will be described below.

Figure 4:
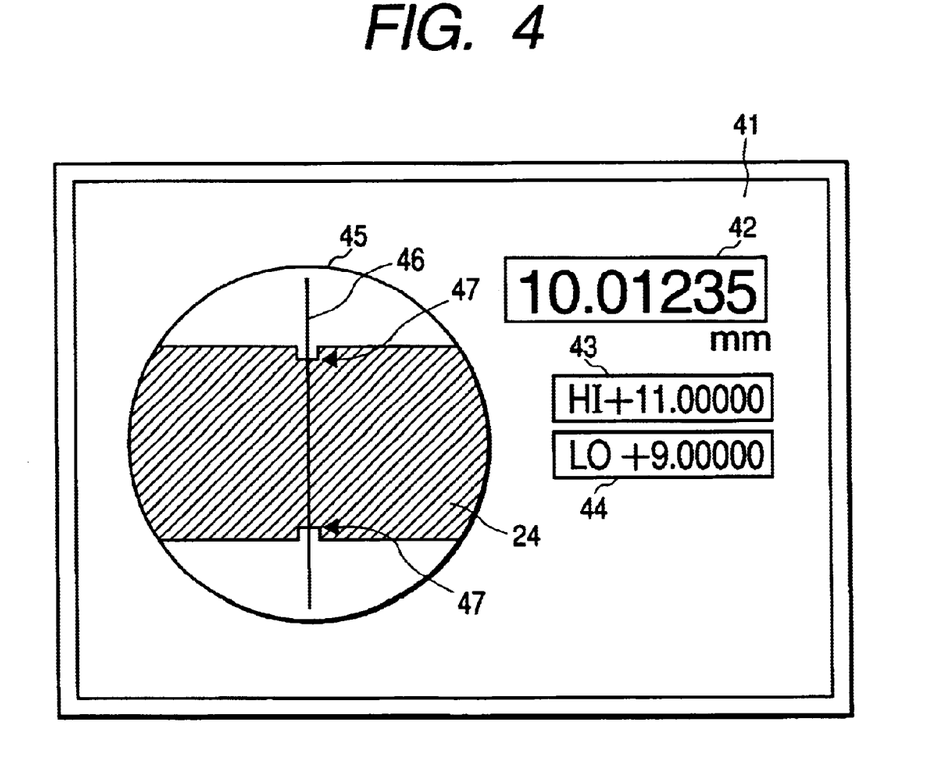
FIG. 4 is a diagram showing an example of screen display in a display section.

FIG. 4 shows an example of screen display obtained by the display section 21 in the non-contact type profile measuring apparatus according to one embodiment.

A measured value 42 of the outside dimension is displayed on the right side of a display screen 41. A monitor image 45 including a measured portion is displayed on the left side. Numeric value display frames 43 and 44 provided under the measured value 42 shows preset upper and lower values of the outside dimension. It is possible to decide whether or not the measured value 42 ranges within a tolerance defined by the upper and lower values.

A vertical line 46 is displayed in the central part of the display frame of the monitor image 45. The vertical line 46 is a measuring line generated by the measuring line generating section 36, and indicates a measured portion to be measured by the one-dimensional image sensor 17. Moreover, triangular marks 47 in two places are edge cursors generated by the edge cursor generating section 35. The triangular mark indicates the edge position of the shadow portion 24 of the measurement object 23 in the measuring line 46.

Figure 5A:
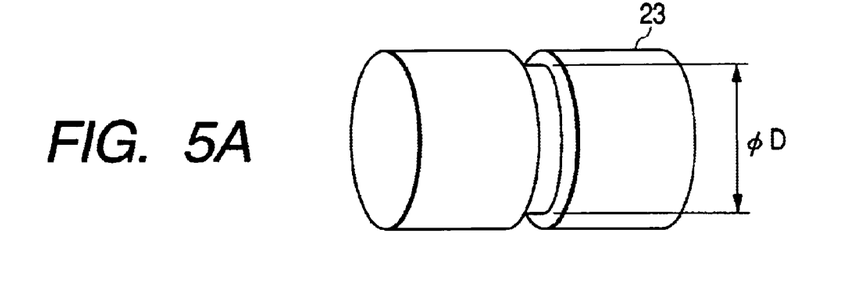
FIG. 5A is a perspective view showing an example of a measurement object.
Figure 5B:
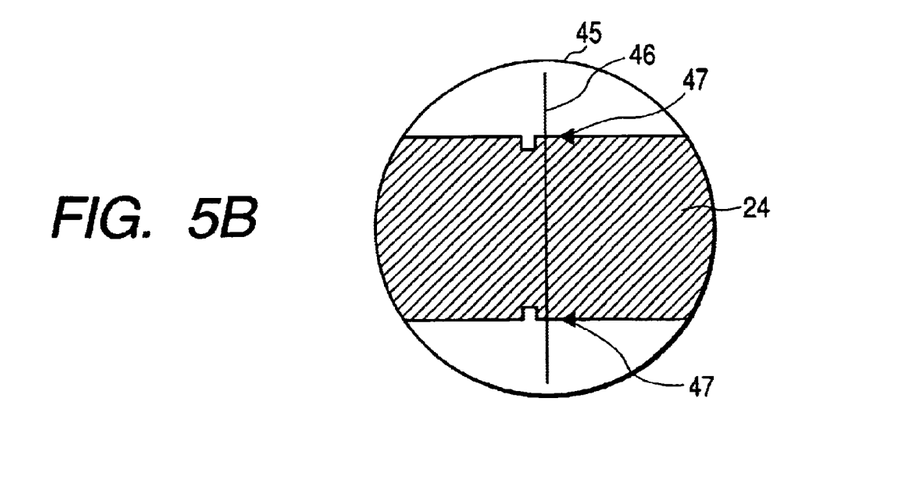
FIGS. 5B and 5C are respectively views showing an example of a monitor image thereof.
Figure 5C:
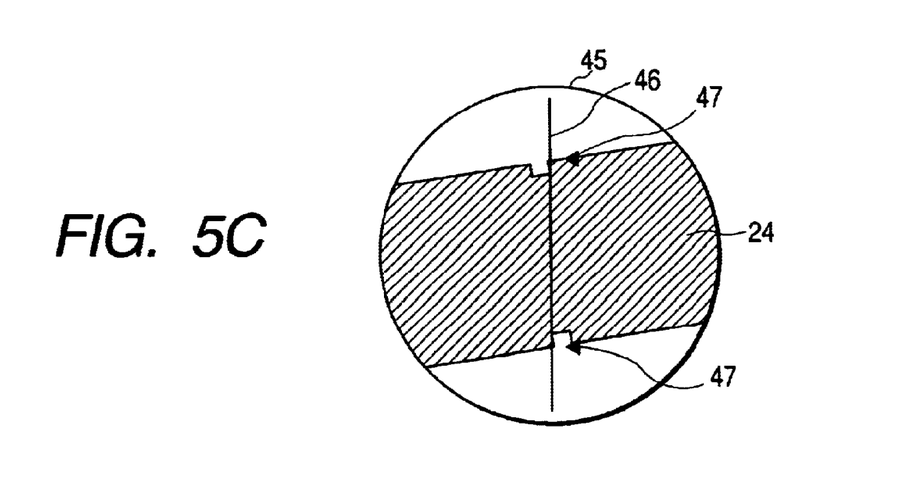

FIG. 5A is a perspective view showing an example of the measurement object 23. FIGS. 5B and 5C show an example of the monitor image 45 obtained in the case in which the portion to be measured cannot be measured accurately. The measurement object 23 has an almost cylindrical shape and has a small diameter portion (a groove portion) formed on the central part in an axial direction. It is assumed that a diameter φD of the small diameter portion is an outside dimension to be measured. In the monitor image 45 of the display screen 41 shown in FIG. 4, it is clear that the small diameter portion of the measurement object 23 (shadow portion 24) is accurately positioned on the measuring line 46 and the two edge cursors 47 measure the diameter φD of the small diameter portion.

In the example of the monitor image 45 shown in FIG. 5B, however, it is indicated that the measuring line 46 is shifted from the small diameter portion of the shadow portion 24. Further, the two edge cursors 47 do not measure the diameter of the small diameter portion but the diameter of a large diameter portion. In the example of the monitor image 45 shown in FIG. 5C, the shadow portion 24 of the measurement object 23 is inclined with respect to the measuring line 46. It is apparent from the display of the two edge cursors 47 that the small diameter portion is not measured accurately.

By displaying the monitor image 45 including the measured portion on the display screen 41 in addition to the measured value 42 as described above, it is possible to easily ascertain whether the portion to be measured is inclined or shifted. Moreover, the measuring line 46, indicative of the measured portion to be measured by the one-dimensional image sensor 17, and the edge cursor, indicative of the edge position in the measuring line 46, are displayed on the display section 45 so that they are superposed on the monitor image 45. Therefore, in the case in which the outside dimension of the particular portion of the measurement object 23 described above is measured, it is possible to accurately position the measurement object 23 while watching the monitor image 45.

The display position of the measuring line 46 is fixed to the center of the monitor image 45. Preferably, fine control of the display position of the measuring line should be carried out in the following manner before the shipment of the profile measuring apparatus 1, for example. The reason was described earlier. In the optical system shown in FIG. 1, the optical path from the light source 11 to the beam splitter 16 is shared by the light receiving system of the one-dimensional image sensor 17 and that of the two-dimensional image sensor 19. Therefore, there is no deviation in the relationship between both image forming positions. In the optical system provided behind the beam splitter 16, however, the deviation in the relationship between both image forming positions may occur because the light receiving system of the one-dimensional image sensor 17 and that of the two-dimensional image sensor 19 act as individual light receiving paths, respectively.

In other words, a deviation in the relationship between the image forming positions which is caused by the attachment positions or an error in an inclination of the one-dimensional image sensor 17 and the two-dimensional image sensor 19 may occur for each profile measuring apparatus 1. In order to correct the deviation, it is preferable that the display position of the measuring line 46 in the display frame of the monitor image 45 is finely controlled for each profile measuring apparatus 1.

Figure 6A:
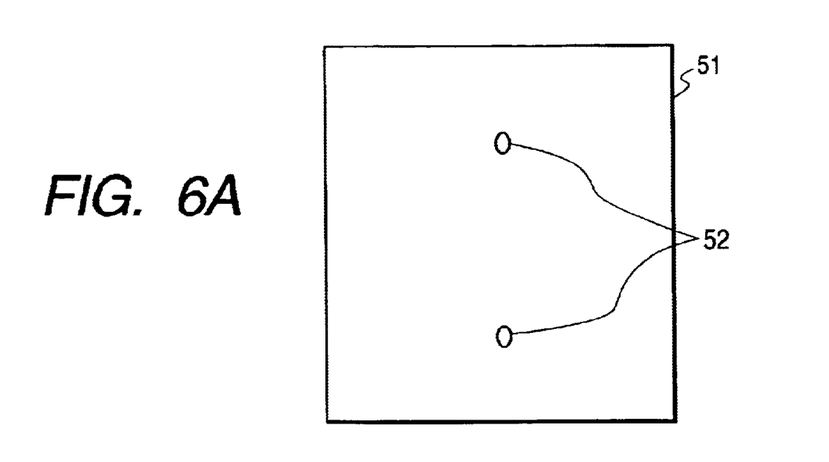
FIGS. 6A–6C are respectively diagrams showing an example of a method of finely controlling the display position of a measuring line in the display frame of a monitor image.
Figure 6B:
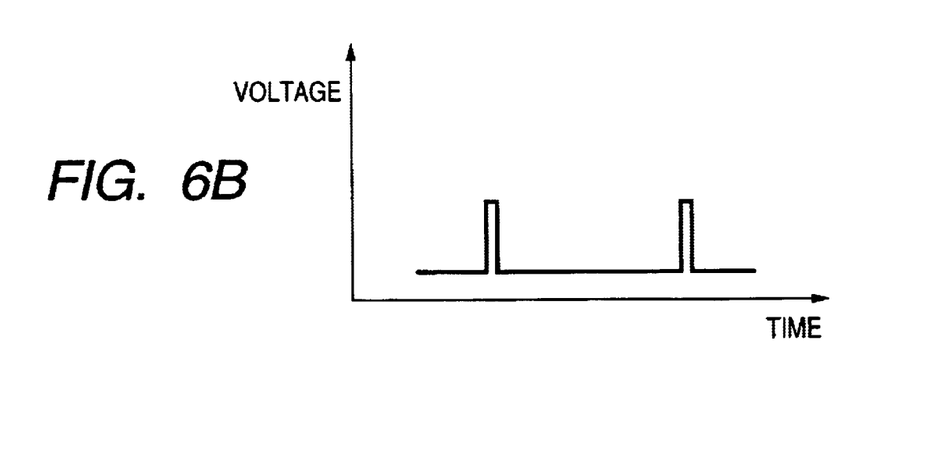
Figure 6C:
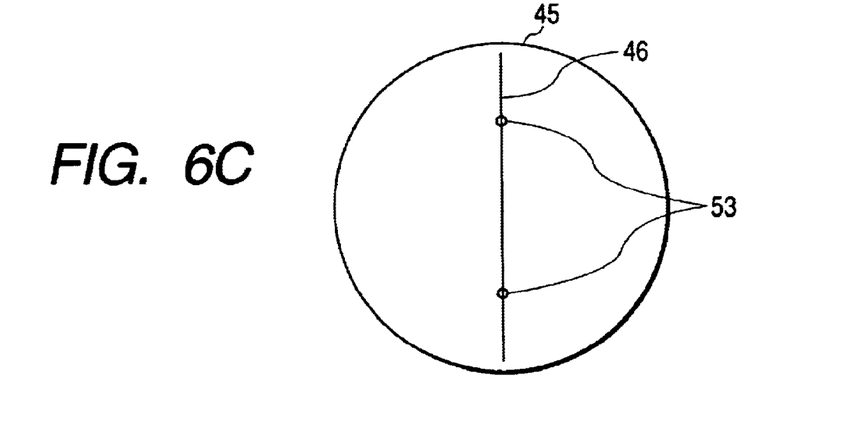

FIGS. 6A–C show an example of a method of finely controlling the display position of the measuring line 46 in the display frame of the monitor image 45.

First of all, a metal plate 51 or other material having two pin holes 52 shown in FIG. 6A formed thereon is prepared. The metal plate 51 is measured as a measurement object for a test by the profile measuring apparatus 1 to carry out positioning such that the two pin holes 52 are positioned on the measuring line 46. The positioning is carried out while monitoring the output voltage signal of the one-dimensional image sensor 17 shown in FIG. 6B. The output signal of the one-dimensional image sensor 17 may be observed by a measuring device such as an oscilloscope. The profile measuring apparatus 1 may have a test mode function of displaying the output voltage signal of the one-dimensional image sensor 17 on the display section 21 of the profile measuring apparatus 1.

In the case in which the two pinholes 52 are positioned on the measuring line 46, a peak level appears in two places corresponding to the two pin holes 52 as shown in FIG. 6B. The metal plate 51 should be positioned such that both of the two peak levels are at their maximum heights. At this time, pin hole images 53 for the two places corresponding to the two pin holes 52 are displayed as the monitor image 45 in the display section 21 of the profile measuring apparatus 1.

If the image forming position of the one-dimensional image sensor 17 is shifted from that of the two-dimensional image sensor 19 for the reason described above, the pin hole images 53 for the two places in the monitor image 45 are shifted from the measuring line 46. In this case, the display position (and the inclination) of the measuring line 46 is changed by predetermined key input to carry out fine control such that the pin hole images 53 for the two places are positioned on the measuring line 46.

The display position of the measuring line 46 thus finely controlled is stored in the memory of the measuring line generating section 36. Such fine control is to be carried out for each profile measuring apparatus 1 and is preferably performed once before shipment, thereby the user does not need to carry out the control. Moreover, it is also possible to carry out the fine control such that the pinhole images 53 for the two places are positioned on the measuring line 46 by moving the fixing position of the holder of the two-dimensional image sensor 19, for example, without changing the display position (and the inclination) of the measuring line 46.

Next, a description will be given to a method of controlling the display position of the edge cursor to be superposed on the monitor image and displayed. As shown in FIG. 3, the edge cursor generating section 35 determines the display position of the edge cursor based on the signal sent from the one-dimensional image sensor 17. Accordingly, a space between the two edge cursors 47 in FIG. 4 accurately corresponds to the measured value calculated based on the output signal of the one-dimensional image sensor 17, for example. In order to accurately superpose the edge cursor 47 on the monitor image 45 (the shadow portion 24 of the measurement object 23) picked up by the two-dimensional image sensor 19 and to display them, however, it is necessary to adjust the relationship between both positions (a bias and a gain) in a direction along the measuring line 46.

Since the pixel numbers and pixel sizes of the one-dimensional image sensor 17 and the two-dimensional image sensor 19 are well known, the relationship between an image forming position on the one-dimensional image sensor 17 and a position in a direction along the measuring line 46 on the two-dimensional image sensor 19 is obtained by a calculation. Accordingly, the edge cursor generating section 35 can obtain the position in the direction along the measuring line 46 on the monitor image 45 by carrying out a predetermined operation over the edge position obtained from the output signal of the one-dimensional image sensor 17. Alternatively, a reference table (lookup table) obtained by previously calculating the relationship between both positions at a predetermined interval may be stored in the memory of the edge cursor generating section 35. In this case, the edge cursor generating section 35 can obtain a position in the direction along the measuring line 46 on the monitor image 45 corresponding to the edge position obtained from the output signal of the one-dimensional image sensor 17 by referring to the lookup table.

Referring to the relationship between the display position of the edge cursor 47 and the monitor image 45, in the same manner as in the display position of the measuring line 46, a deviation may be caused for each profile measuring apparatus 1 by the attachment positions or an error in an inclination of the one-dimensional image sensor 17 and the two-dimensional image sensor 19. Accordingly, it is preferable that the display position of the edge cursor 47 is also controlled finely before the shipment of the profile measuring apparatus 1. The fine control is carried out by changing the display position of the edge cursor 47 by predetermined key input such that the edge cursor 47 is accurately displayed in the edge portion of the monitor image displayed when the proper measurement object 23 is measured.

Figure 7:
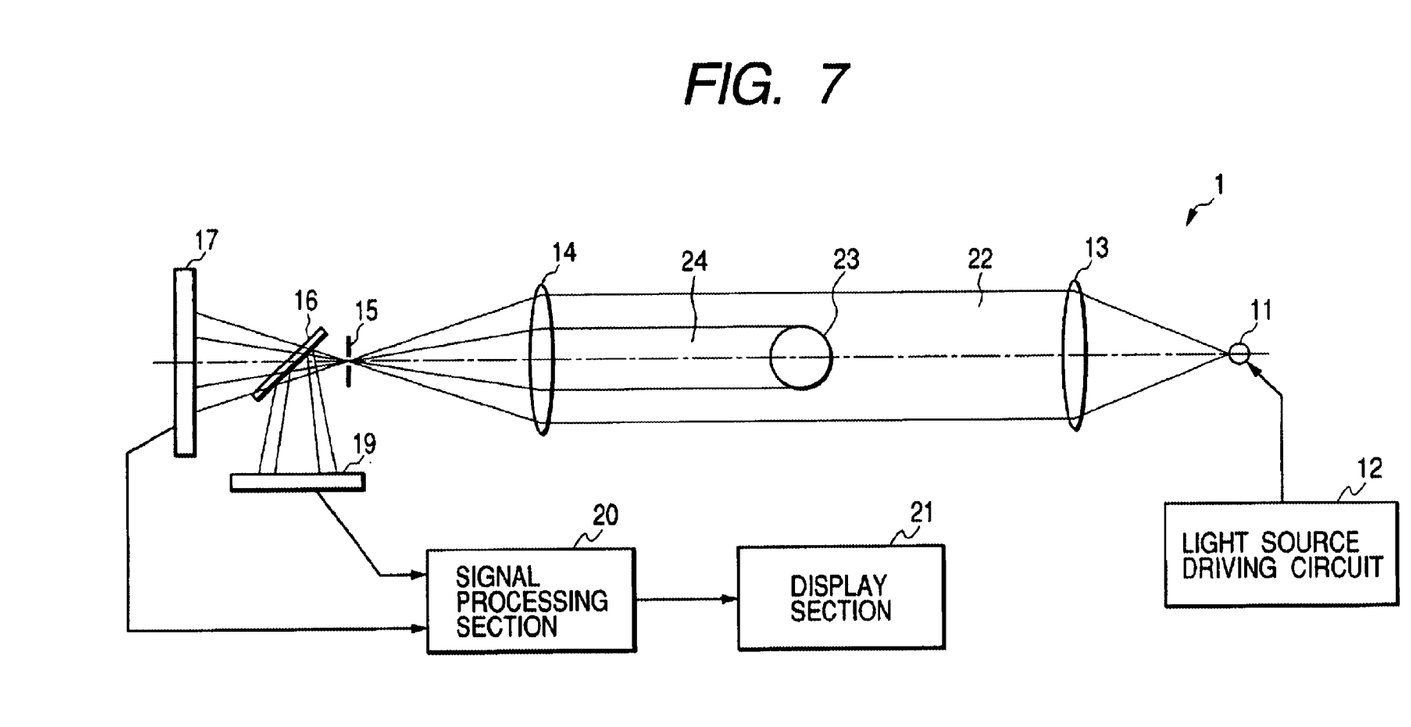
FIG. 7 is a block diagram showing a structure including the optical system of a non-contact type profile measuring apparatus according to another embodiment of the invention.

Next, FIG. 7 shows a structure including the optical system of a non-contact type profile measuring apparatus according to another embodiment of the invention.

In the optical system shown in FIG. 7, a beam splitter 16 is provided between a first diaphragm 15 and a one-dimensional image sensor 17 differently from the optical system according to the embodiment shown in FIG. 1. Consequently, the optical system shown in FIG. 7 does not require the second diaphragm 18 which is required for the optical system shown in FIG. 1. The optical system shown in FIG. 7 can easily be employed in a structure in which a distance between the first diaphragm 15 and the one-dimensional image sensor 17 can be comparatively increased as in the case of a magnifying optical system. In the case in which the size of the one-dimensional image sensor 17 is small and the distance between the first diaphragm 15 and the one-dimensional image sensor 17 is short, (e.g., over ten millimeters, more specifically, a range of not less than 10 millimeters and not more than twenty millimeters. Other amounts are possible.) as in an ordinary reducing optical system, it is difficult to provide the beam splitter 16 therebetween. Therefore, for the ordinary reducing optical system, the structure of the optical system shown in FIG. 1 is suitable.

While the embodiments of the invention have been described by properly including the variant, the invention is not restricted to the embodiments and the variant but can be embodied in various configurations.

What is claimed is:

1. A non-contact type profile measuring apparatus comprising:
    a converting section for converting a light transmitted from a light source into a light including a component parallel with an optical axis;
    a light receiving lens for receiving a light including a shadow of a measurement object which is provided to intercept a part of the light;
    a first diaphragm provided in a first rear side focal position of the light receiving lens;
    a one-dimensional image sensor for receiving a light passing through the first diaphragm;
    a signal processing section for obtaining a dimension of the shadow of the measurement object as an outside dimension of the measurement object by processing an electric signal obtained from the one-dimensional image sensor;
    a display section for displaying the outside dimension thus obtained;
    a beam splitter provided on an optical path between the light receiving lens and the one-dimensional image sensor; and
    a two-dimensional image sensor for receiving a light split by the beam splitter,
    wherein the signal processing section processes an electric signal obtained from the two-dimensional image sensor, and the display section displays a monitor image including a measured portion of the measurement object.

2. The non-contact type profile measuring apparatus according to claim 1, wherein the beam splitter is provided between the first diaphragm and the one-dimensional image sensor.

3. The non-contact type profile measuring apparatus according to claim 1, further comprising:
    a second diaphragm in a second rear side focal position of the light receiving lens formed between the beam splitter and the two-dimensional image sensor,
    wherein the beam splitter is provided between the light receiving lens and the first diaphragm.

4. The non-contact type profile measuring apparatus according to claim 1, wherein the signal processing section obtains a measuring line corresponding to the measured portion of the measurement object from which the one-dimensional image sensor receives the light, and the display section displays the measuring line so that it is superposed on the monitor image of the measurement object.

5. The non-contact type profile measuring apparatus according to claim 1, wherein the signal processing section obtains a mark indicative of an edge position of the shadow of the measurement object by processing the electric signal obtained from the one-dimensional image sensor, and the display section displays the mark so that it is superposed on the monitor image of the measurement object.

6. The non-contact type profile measuring apparatus according to claim 1, wherein the display section displays a tolerance of the outside dimension of the measurement object.

* * * * *